(12) United States Patent
Chun

(10) Patent No.: US 12,530,923 B2
(45) Date of Patent: Jan. 20, 2026

(54) METHOD FOR MEASURING NON-CONTACT BIOMETRIC INFORMATION

(71) Applicant: EVER INFORMATION TECHNOLOGY CO., LTD., Daejeon (KR)

(72) Inventor: Jae Du Chun, Daejeon (KR)

(73) Assignee: EVER INFORMATION TECHNOLOGY CO., LTD., Daejeon (KR)

( * ) Notice: Subject to any disclaimer, the term of this patent is extended or adjusted under 35 U.S.C. 154(b) by 295 days.

(21) Appl. No.: 18/217,925

(22) Filed: Jul. 3, 2023

(65) Prior Publication Data

US 2024/0242537 A1 Jul. 18, 2024

(51) Int. Cl.
*G06V 40/16* (2022.01)
*G06T 7/246* (2017.01)

(52) U.S. Cl.
CPC ............ *G06V 40/172* (2022.01); *G06T 7/246* (2017.01); *G06V 40/171* (2022.01)

(58) Field of Classification Search
CPC .... G06V 40/172; G06V 40/171; G06T 7/246; G06F 18/00
See application file for complete search history.

(56) References Cited

U.S. PATENT DOCUMENTS

2021/0015376 A1\* 1/2021 Kim ................. G16H 50/20

FOREIGN PATENT DOCUMENTS

| KR | 1020190109654 | 9/2019 |
| KR | 1020200079691 | 7/2020 |
| KR | 1020200087540 | 7/2020 |

OTHER PUBLICATIONS

Kumar, Mayank, Ashok Veeraraghavan, and Ashutosh Sabharwal. "DistancePPG: Robust non-contact vital signs monitoring using a camera." Biomedical optics express 6, No. 5 (2015): 1565-1588. (Year: 2015).*

\* cited by examiner

*Primary Examiner* — Wassim Mahrouka
(74) *Attorney, Agent, or Firm* — IPLA P.A.

(57) ABSTRACT

A method for measuring a non-contact biometric information, includes steps of photographing an image including a user's face; detecting a face area in a frame of a photographed image; detecting a landmark within the face area and starting a tracking mode when a specific landmark is detected; detecting a movement of the face area in the tracking mode and determining a section in which the movement of the face is less than a reference value; and extracting a skin area within the face area in the determined section and acquiring pixel change component data of the skin area.

5 Claims, 6 Drawing Sheets

FIG. 6

| Label | Input value | | | |
|---|---|---|---|---|
| | Pixel change component data 1 | Pixel change component data 2 | Pixel change component data 3 | Pixel change component data 4 |
| 79 | ~^~ | ~^~ | ~^~ | ~^~ |
| 77 | ~^~ | ~^~ | ~^~ | ~^~ |

| Label | Input value | | | |
|---|---|---|---|---|
| | Face movement component data 1 | Pixel change component data 1 | Pixel change component data 2 | Pixel change component data 3 |
| 79 |  |  |  |  |
| 77 |  |  | | | ns
METHOD FOR MEASURING NON-CONTACT BIOMETRIC INFORMATION

BACKGROUND

The present invention relates to a method for measuring non-contact biometric information based on an image, and more particularly, to a non-contact biometric information measurement technology that is strong to a movement noise.

In general, heart rate, oxygen saturation, respiratory rate, etc. are major biometric signals for diagnosing and tracking the physiological state of the human body. Methods commonly used in the medical field for monitoring these biometric signals include an electrocardiography (ECG), which measures electrical heartbeat signals by attaching electrodes to the chest, etc. and a PPG (Photoplethysmography), which measures heart rate and oxygen saturation by attaching an optical sensor called a pulse oximeter to the fingertip or ear. However, in the case of these methods, since the sensor should maintain contact with a part of the body, there is a disadvantage in that the measurement object must not move during the measurement time.

Accordingly, Korean Patent Application Laid-Open No. 10-2020-0079691 discloses an image-based non-contact bio-signal measurement device and an operating method thereof that improve real-time performance when measuring heart rate by detecting spectroscopic fine changes in the face area using a camera.

Despite the convenience of this image-based measurement method, it is still limited for various reasons to be applied in daily life. In the image-based measurement methods, the main issues of research are to improve the signal-to-noise ratio and overcome lighting changes and movement noise.

Accordingly, Korean Patent Registration No. 10-2150635, etc. discloses a method and device for measuring a heart rate based on a vision system in that it assigns standard heart rate data (PPG data measured by a PPG sensor) as a label; constructs a data set by featuring the corresponding relative power density (a value obtained by normalizing the size of the frequency band of fine movement data); performs a clustering (determining the belonging cluster through extraction of the center point of each cluster and calculating the distance of RPD for the center value) about the constructed data set; registers as a rule-base, if the kurtosis value of label distribution of each cluster is more than a normal distribution; and determines a label value of the rule base showing the most similar pattern as a final heart rate by comparing the extracted RPD with the rule base in order to determine or infer the heart rate using the learned rule base.

The Patent literature is a technique for detecting the heart rate by learning the pattern of relative power density for the actual measured value. However, since the pattern of the relative power density itself changes when the face moves or the lighting changes, there is a problem in that it cannot sufficiently respond to the face movement.

In addition, Korean Patent Application Laid-Open No. 10-2019-0109654 discloses a technique in that it groups a user's face included in an image into a plurality of areas including a plurality of pixels having similar colors; and obtains the user's heartbeat by inputting pulse signals for a plurality of areas grouped into the same group to an artificial intelligence learning model.

However, in the patent literature, it is useful when the user's facial skin changes due to lighting change or user movement. However, there is a problem in that the accuracy of measurement is lowered when a motion disturbance occurs in which the facial motion period is close to the heart rate.

On the other hand, when patients visit a medical institution such as a hospital for medical treatment, they go through complicated processes such as access check, identity check, nurse check, biometric information measurement, and the like. However, this process takes a considerable amount of time and is complicated, which is very cumbersome for the patient.

PATENT LITERATURE

Patent Literature 1: Korean Patent Application Laid-Open No. 10-2020-0079691 (Jul. 6, 2020; Camera-based contactless bio-signal measurement apparatus and operating method thereof)

Patent Literature 2: Korean Patent Registration No. 10-2150635 (Aug. 26, 2020; Method for measuring heart rate based on vision system)

Patent Literature 3: Korean Patent Application Laid-Open No. 10-2019-0109654 (Sep. 26, 2019; Electronic device and method for measuring heart rate)

SUMMARY OF THE INVENTION

The present disclosure has been made in an effort to solve the problems described above, and an objective of the present invention is to provide a method for measuring non-contact biometric information in that it provides a biometric information measuring device that is robust against a movement noise of a user, so that the user's biometric information can be quickly and accurately detected in a non-contact manner.

Another objective of the present invention is to provide a method for measuring non-contact biometric information capable of greatly simplifying a medical treatment procedure by obtaining the user's biometric information together with user authentication through face recognition when a patient enters a medical institution.

Further another object of the present invention is to provide a biometric information measuring device that can be applied to a non-face-to-face telemedicine system for remote personal health management based on face information.

According to one aspect of the present invention so as to accomplish these objects, there is provided to a method for measuring a non-contact biometric information, including steps of:

photographing an image including a user's face; detecting a face area in a frame of a photographed image; detecting a landmark within the face area and starting a tracking mode when a specific landmark is detected; detecting a movement of the face area in the tracking mode and determining a section in which the movement of the face is less than a reference value; and extracting a skin area within the face area in the determined section and acquiring pixel change component data of the skin area.

At this time, the tracking mode further includes a step of extracting movement component data of the face and the biometric information of the user is measured using the movement component data of the face and the pixel change component data of the skin area.

In addition, the skin area in the face area is divided into a plurality of spot areas and the user's biometric information is measured using the pixel change component data of preset measurement spot areas among the plurality of spot areas, and the measurement spot area is a spot area in which a similarity of the user's biometric information measured using the pixel change component data is higher than a reference value compared to the user's biometric information measured using a contact-type biometric sensor.

In addition, the method further includes a step of processing a user authentication based on a detected landmark and when the user authentication is processed, coordinate information of the measurement spot area is extracted from pre-stored user information.

In addition, the user's biometric information is measured by inputting the movement component data of the face and the pixel change component data of the skin area as input data to a learning model.

In addition, the pixel change component data of the skin area as the input data includes pixel change component data of a plurality of measurement spot areas among the skin area.

In addition, the method further includes a step of processing a user authentication based on a detected landmark and when the user authentication is processed, coordinate information of the measurement spot area is extracted from pre-stored user information.

BRIEF DESCRIPTION OF THE DRAWINGS

The above and other objects, features and advantages of the present invention will be more apparent from the following detailed description taken in conjunction with the accompanying drawings, in which:

FIG. 6 illustrates a labeling method for input values;

REFERENCE SIGNS LIST

1: terminal
2: User authentication server
10: Camera
20: Processing unit
30: Display unit
L: landmark
A: Measurement spot area
F: Face outline

DETAILED DESCRIPTION OF THE PREFERRED EMBODIMENT

Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

Unless differently defined, all the terms used here including technical or scientific terms have the same meaning with what is generally understood by one who has common knowledge in the technical field that this invention belongs to. The terms such as those defined in the dictionary commonly used will be interpreted to have the meanings matching with the meanings in the context of the related technologies. Unless clearly defined in this application, they are not interpreted as ideal or excessively formal meanings.

Hereafter, the preferred embodiment according to the present disclosure are described in detail with reference to the accompanying drawings.

Figure 1:
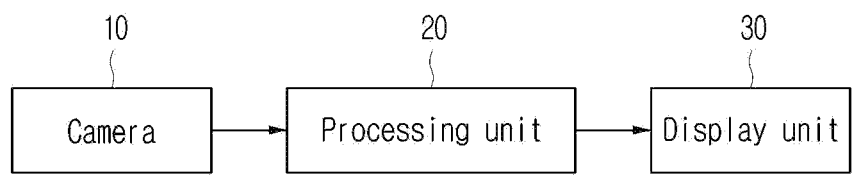
FIG. 1 is a block diagram illustrating a configuration of a non-contact biometric information measurement system according to the present invention.

FIG. 1 is a block diagram illustrating a configuration of a non-contact biometric information measurement system according to the present invention.

Referring to FIG. 1, the non-contact biometric information measurement system according to the present invention includes a camera (10) that photographs a user's face, a processing unit (20) that measures the biometric information such as heart rate from a user's face image captured by the camera (10), a display unit (30) that displays the measured biometric information.

The processing unit (20) includes an image recording unit for storing a plurality of consecutive image frames (video data) photographed by the camera (10), an operation unit for extracting the image frames stored in the image recording unit and measuring the biometric information, and a display control unit for displaying measurement results calculated by the operation unit on the display unit (30).

A process of measuring biometric information such as heart rate from the user's face image captured by the camera (10) in the processing unit (20) will be described in detail with reference to FIG. 2 below.

Figure 2:
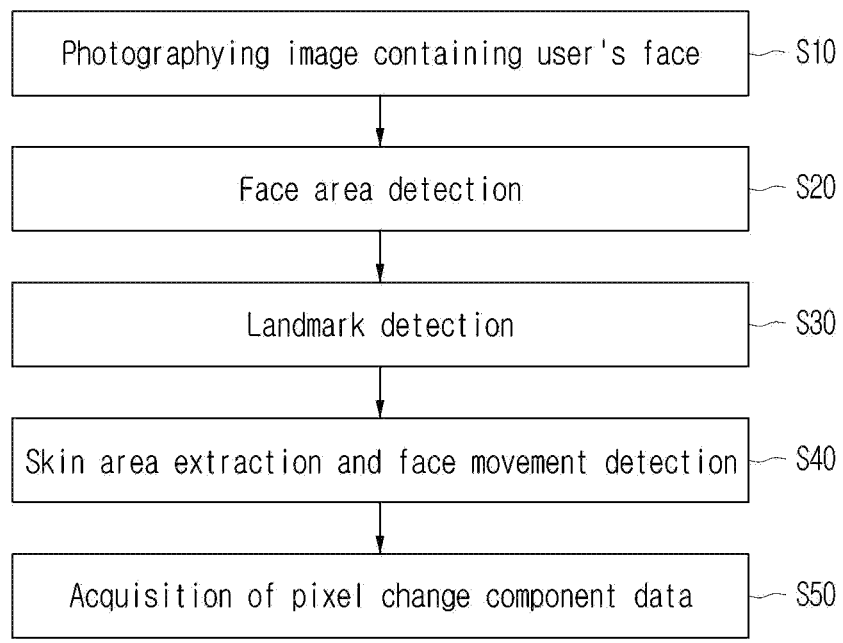
FIG. 2 is a flowchart illustrating a process in which a method for measuring non-contact biometric information according to the present invention is performed.

FIG. 2 is a flowchart illustrating a process in which a method for measuring non-contact biometric information according to the present invention is performed.

First, the camera (10) photographs an image including a user's face and transmits the photographed image data to the processing unit (20) (S10). At this time, the processing unit (20) converts a RGB coordinate system into a HSV coordinate system for one frame image from the received image and extracts only the H (hue) component from the HSV image.

Then, a face area is detected in the image (S20).

To detect the face area, a preprocessing process of converting the extracted image into a gray color and then equalizing a histogram is performed. A face area detection may determine whether a pixel of a specific size is a face based on the color and saturation of the skin color.

When the face area is detected, a plurality of landmarks located in the face area are detected (S30). After preprocessing, the landmarks are detected from the frame image using the MCT Adaboost algorithm. The landmarks are detected in front of the face, and 64 landmarks can be detected. When the nose area among the landmarks is detected, the tracking mode is started.

When the tracking mode is initiated, the skin area is extracted from the face area, and a section with the minimum movement is determined by detecting the movement of the face (S40). This section may be determined as a section in which the movement of the face is smaller than the reference value. That is, when the movement of the face is not greater than the reference value within a time interval in which the biometric information can be detected, the biometric information is measured for an image captured in the corresponding time interval.

In the corresponding time interval, pixel change component data of the skin area is obtained, and a FFT (Fast Fourier Transform) is performed on this data to find the main heartbeat frequency (S50).

Figure 3:
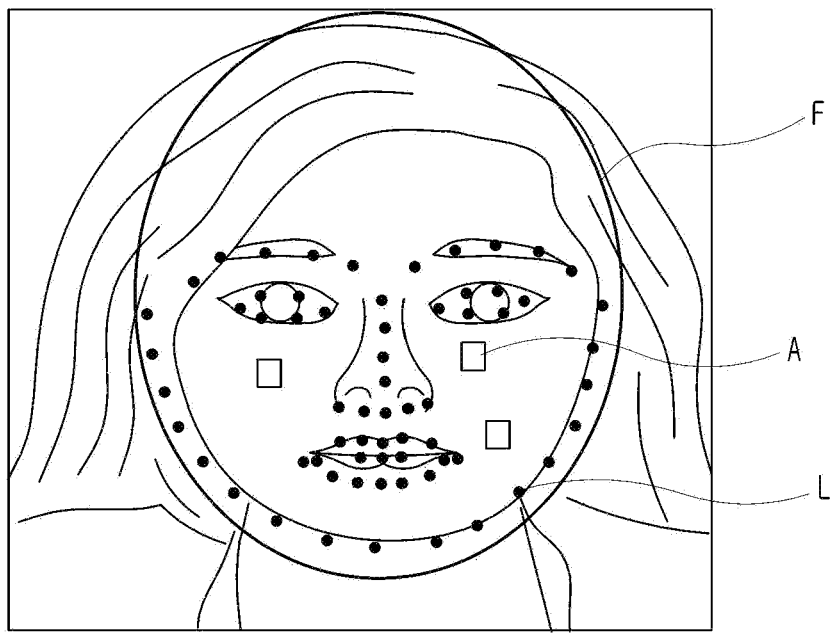
FIG. 3 illustrates landmarks, candidate measurement spot areas, and face outline in a face image.

FIG. 3 illustrates landmarks, candidate measurement spot areas, and face outline in a face image.

FIG. 3 shows a plurality of landmarks (L) detected in step (S30). In addition, the face outline (F) is a figure expressing the outline shape of the approximate face formed in an elliptical shape to include the extracted landmarks (L).

In the present invention, the face outline (F) predicts the distance between the user's face and the camera (10) according to the size of the figure, and can be used for correcting the color change of pixels according to the predicted distance or learning the degree to which the measured biometric information value varies according to the predicted distance On the other hand, the measurement spot area (A) is a detailed area selected to analyze the pixel change component data among the skin area. The measurement time is shortened by analyzing the pixel change component data only for the measurement spot area (A) rather than the entire skin area. At the same time, it is possible to increase the accuracy of the biometric information measurement.

The measurement spot area (A) is compared with the user's biometric information measured using the contact biometric sensor for a plurality of candidate spot areas set in advance and it may be determined by selecting the spot areas in which the degree of similarity of the biometric information of the user measured using the pixel change component data is higher than a reference value.

Accordingly, the processing unit (20) analyzes the pixel change component data for the plurality of preset measurement spot areas (A) set in advance and measures the user biometric information using an average value of the measured values or an average value of only similar measured values.

Figure 4:
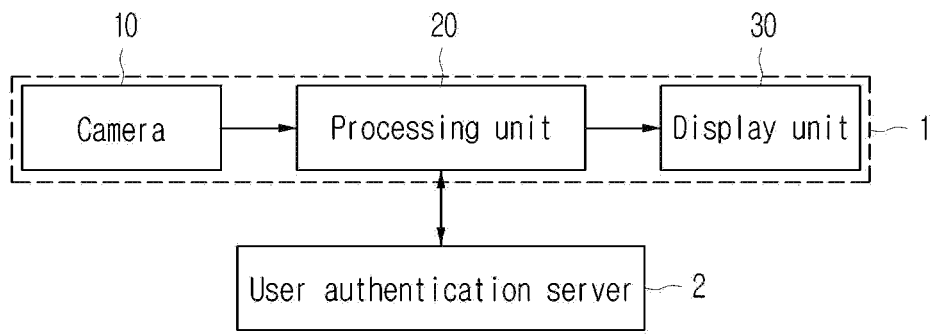
FIG. 4 is a block diagram illustrating a configuration of a non-contact biometric information measurement system according to another embodiment of the present invention.

FIG. 4 is a block diagram illustrating a configuration of a non-contact biometric information measurement system according to another embodiment of the present invention.

The embodiment of FIG. 4 may be applied to a medical treatment registration or remote medical diagnosis in a medical institution such as a hospital.

As shown in FIG. 4, the camera (10), the processing unit (20), and the display unit (30) may be provided in one terminal (1) and the terminal (1) is installed near the entrance of the medical institution and can be used for purposes such as a user identification and a user biometric information acquisition.

The terminal (1) is connected to the user authentication server (2) through a communication network, transmits a captured image of the user face to the user authentication server (2), and receives a user confirmation or authentication signal from the user authentication server (2).

The present invention may include a process of measuring the user's biometric information after confirming the user. Here, user identification and biometric information measurement can be performed both in the terminal (1) and in the user authentication server (2).

In addition, the coordinate information of the measurement spot area (A) described in FIG. 3 may be previously stored in the user information of the user authentication server (2). That is, the measurement spot areas (A), in which it is easy to acquire the biometric information and whose value is highly accurate, may be different for each person. Therefore, when the user information is registered, biometric the information measurement values measured for a plurality of measurement area are compared with actual measurement values, and measurement areas having a high degree of similarity are set as measurement spot areas (A), and the coordinate information of the corresponding areas may be stored therein. Here, the actual measured value may be a value measured using a contact-type biometric information measurement device or a biometric information measurement value obtained through analysis of an image captured using the camera in a state in which there is no movement of the user and the lighting environment is strictly controlled.

Figure 5:
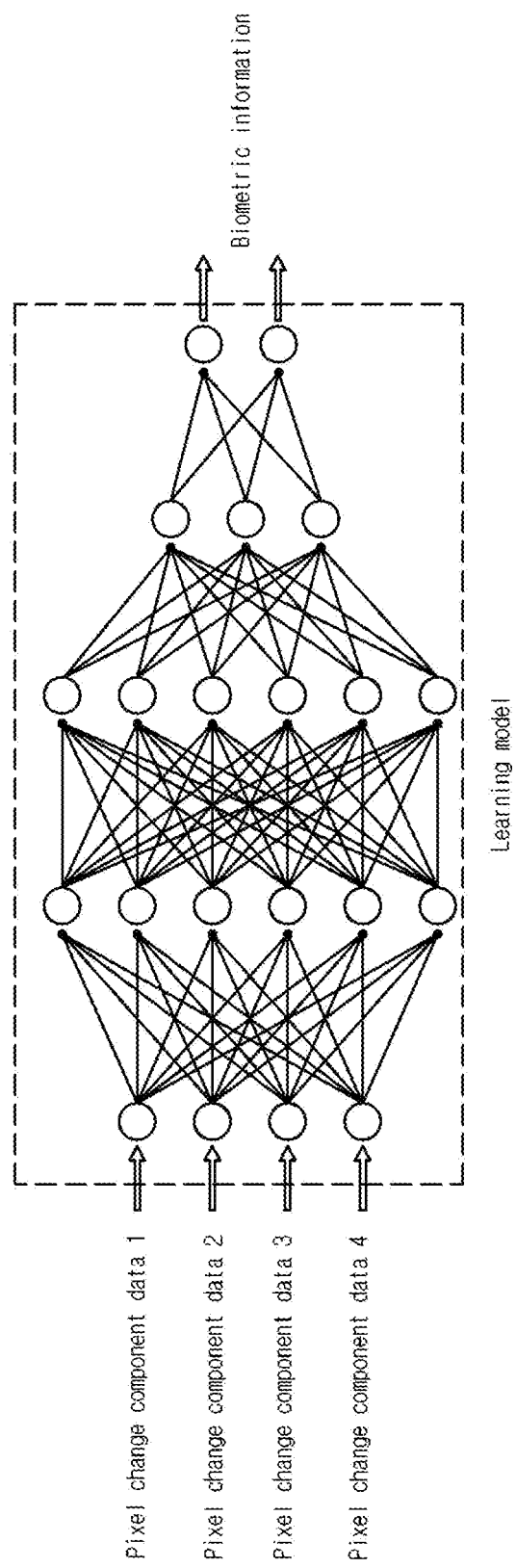
FIG. 5 is a diagram for explaining a method for measuring a non-contact biometric information using a learning model.

FIG. 5 is a diagram for explaining a method for measuring a non-contact biometric information using a learning model and FIG. 6 illustrates a labeling method for input values.

The embodiment of FIG. 5 does not use the biometric information value obtained through the FFT, but rather measures the biometric signal by labeling the measured pixel change component data as an actual measurement value, inputting the data to a learning model, and then learning it.

In order to measure biometric information that is robust to the movement of the face, the present invention uses pixel change component data measured in the plurality of measurement spot areas (A) as input values, labels each input value as an actual measurement value, and inputs it to the learning model. FIG. 6 illustrates the case of four input values, which means that pixel change component data measured in the four measurement spot areas (A) are used as input values.

Here, as described above, the actual measured value is a value measured using the contact-type biometric information measuring device or a biometric information measurement value obtained through the analysis of the image captured using the camera in a state in which there is no movement of the user and the lighting environment is strictly controlled.

In the present embodiment, since the learning is performed using the pixel change component data measured at various points with high measurement accuracy, even when the face moves or the lighting changes, it is possible to measure the biometric information with high accuracy compared to the prior art.

In addition, although the signal waveform values as the pixel change component data are used as inputs in this embodiment. However, in some cases, the learning accuracy may be higher when the input values are simple.

Therefore, instead of using the signal waveform value as the input value, it is also possible to use the biometric value measured through the pixel change component data measured in the measurement spot area (A) as then input value.

Figure 7:
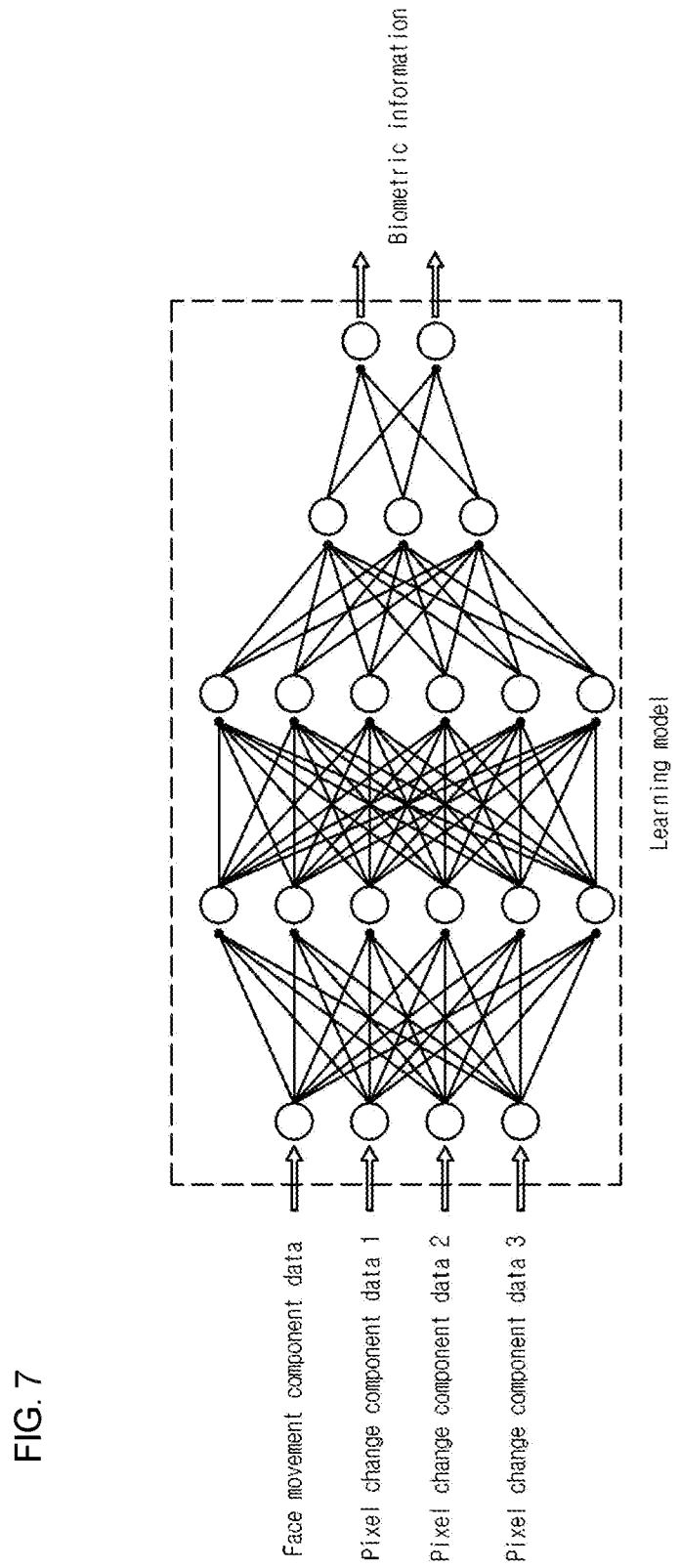
FIG. 7 is a diagram for explaining a method for measuring a non-contact biometric information using a learning model according to another embodiment of the present invention.
Figure 8:
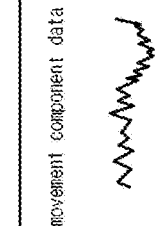
FIG. 8 illustrates a labeling method for input values according to another embodiment of the present invention.
Figure 8:
Figure 8:
Figure 8:
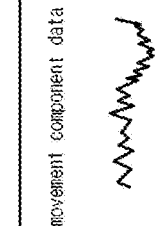
Figure 8:
Figure 8:

FIG. 7 is a diagram for explaining a method for measuring a non-contact biometric information using a learning model according to another embodiment of the present invention and FIG. 8 illustrates a labeling method for input values according to another embodiment of the present invention.

The embodiment of FIG. 7 further adds a face movement component data as an input value to the embodiment of FIG. 5 in order to consider noise generation components according to the movement of the face.

In this embodiment, the face movement component data and the pixel change component data measured in the plurality of measurement spot areas (A) are used as the input values, and each input value is labeled as an actual measurement value and input to the learning model. FIG. 6 illustrates the case of four input values, which means that one face movement component data and pixel change component data measured in three measurement spot areas (A) are used as the input values.

In this embodiment, the learning is performed using the pixel change component data measured at various points with high measurement accuracy and it is performed by reflecting the face movement components in the learning process, so that the noise caused by the face movement can be removed, resulting in higher accuracy, thereby measuring the biometric information with higher accuracy.

According to the present invention, there is an effect in that, even if a user's movement occurs, it is possible to accurately the measure biometric information from the user's face image, thereby improving a non-face-to-face telemedicine service and it diagnoses a patient's condition in the entry and exit process at a medical institution, thereby simplifying the administrative procedures.

While the present invention has been described with respect to the specific embodiments, it will be apparent to those skilled in the art that various changes and modifications may be made without departing from the spirit and scope of the invention as defined in the following claims.

What is claimed is:

1. A method for measuring a non-contact biometric information, comprising steps of:
   photographing an image including a user's face;
   detecting a face area in a frame of the photographed image;
   detecting a landmark within the face area and starting a tracking mode when a specific landmark is detected;
   detecting a movement of the face area in the tracking mode and determining a section in which the movement of the face is less than a reference value; and
   extracting a skin area within the face area in the determined section and acquiring pixel change component data of the skin area,
   wherein the tracking mode further includes a step of extracting movement component data of the face,
   wherein the biometric information of the user is measured using the movement component data of the face and the pixel change component data of the skin area,
   wherein the user's biometric information is measured by inputting the movement component data of the face and the pixel change component data of the skin area as input data to a learning model.

2. The method according to claim 1, wherein the skin area in the face area is divided into a plurality of spot areas and the user's biometric information is measured using the pixel change component data of preset measurement spot areas among the plurality of spot areas, and
   the measurement spot area is a spot area in which a similarity of the user's biometric information measured using the pixel change component data is higher than a reference value compared to the user's biometric information measured using a contact-type biometric sensor.

3. The method according to claim 2, further comprising a step of processing a user authentication based on a detected landmark, wherein, when the user authentication is processed, coordinate information of the measurement spot area is extracted from pre-stored user information.

4. The method according to claim 1, wherein the pixel change component data of the skin area as the input data includes pixel change component data of a plurality of measurement spot areas among the skin area.

5. The method according to claim 4, further comprising a step of processing a user authentication based on a detected landmark, wherein, when the user authentication is processed, coordinate information of the measurement spot area is extracted from pre-stored user information.

\* \* \* \* \*